(12) United States Patent
Das et al.

(10) Patent No.: US 11,550,912 B2
(45) Date of Patent: Jan. 10, 2023

(54) DETECTION OF EXPLOITATIVE PROGRAM CODE

(71) Applicant: SONICWALL INC., Milpitas, CA (US)

(72) Inventors: Soumyadipta Das, Bangalore (IN); Sai Sravan Kumar Ganachari, Bangalore (IN); Yao He, San Jose, CA (US); Aleksandr Dubrovsky, Los Altos, CA (US)

(73) Assignee: SONICWALL INC., Milpitas, CA (US)

( * ) Notice: Subject to any disclaimer, the term of this patent is extended or adjusted under 35 U.S.C. 154(b) by 269 days.

(21) Appl. No.: 16/903,060

(22) Filed: Jun. 16, 2020

(65) Prior Publication Data
US 2020/0380127 A1    Dec. 3, 2020

Related U.S. Application Data

(63) Continuation of application No. 15/858,785, filed on Dec. 29, 2017, now Pat. No. 10,685,110.

(51) Int. Cl.
*G06F 21/56*    (2013.01)
(52) U.S. Cl.
CPC .......... *G06F 21/563* (2013.01); *G06F 21/566* (2013.01); *G06F 2221/034* (2013.01)
(58) Field of Classification Search
CPC .......... G06F 21/50; G06F 21/51; G06F 21/53; G06F 21/568; G06F 21/563;

(Continued)

(56) References Cited

U.S. PATENT DOCUMENTS

| | | | |
|---|---|---|---|
| 6,154,844 A | 11/2000 | Touboul et al. |
| 6,804,780 B1 | 10/2004 | Touboul |

(Continued)

FOREIGN PATENT DOCUMENTS

| | | |
|---|---|---|
| EP | 3 732 571 | 11/2020 |
| GB | 2553033 | 2/2018 |

(Continued)

OTHER PUBLICATIONS

U.S. Appl. No. 16/055,958 Office Action dated Mar. 25, 2021.

(Continued)

*Primary Examiner* — Malcolm Cribbs
(74) *Attorney, Agent, or Firm* — Polsinelli LLP

(57) ABSTRACT

The present disclosure is directed to monitoring internal process memory of a computer at a time with program code executes. Methods and apparatus consistent with the present disclosure monitor the operation of program code with the intent of detecting whether received program inputs may exploit vulnerabilities that may exist in the program code at runtime. By detecting suspicious activity or malicious code that may affect internal process memory at run-time, methods and apparatus described herein identify suspected malware based on suspicious actions performed as program code executes. Runtime exploit detection may detect certain anomalous activities or chain of events in a potentially vulnerable application during execution. These events may be detected using instrumentation code when a regular code execution path of an application is deviated from.

20 Claims, 7 Drawing Sheets

(58) Field of Classification Search
CPC .. G06F 21/566; G06F 2221/034; G06F 21/52; G06F 21/55; G06F 21/552; G06F 21/554; G06F 21/56; G06F 21/62; G06F 21/6209; H04L 63/14; H04L 63/1408; H04L 63/1416; H04L 63/1441; H04L 63/1466
See application file for complete search history.

(56) References Cited

U.S. PATENT DOCUMENTS

| | | |
|---|---|---|
| 6,965,968 B1 | 11/2005 | Touboul |
| 7,058,822 B2 | 6/2006 | Edery et al. |
| 7,523,502 B1 | 4/2009 | Kennedy et al. |
| 7,613,926 B2 | 11/2009 | Edery et al. |
| 7,647,633 B2 | 1/2010 | Edery et al. |
| 7,934,103 B2 | 4/2011 | Kidron |
| 7,962,959 B1 | 6/2011 | Batenin |
| 7,971,255 B1 | 6/2011 | Kc et al. |
| 7,975,305 B2 | 7/2011 | Rubin et al. |
| 8,104,089 B1 | 1/2012 | Guo et al. |
| 8,141,154 B2 | 3/2012 | Gruzman et al. |
| 8,146,151 B2 | 3/2012 | Hulten et al. |
| 8,225,408 B2 | 7/2012 | Rubin et al. |
| 8,276,202 B1 | 9/2012 | Dubrovsky et al. |
| 8,307,432 B1 | 11/2012 | Feng |
| 8,413,235 B1 | 4/2013 | Chen et al. |
| 8,539,578 B1 | 9/2013 | Zhou et al. |
| 8,595,829 B1 | 11/2013 | Kane |
| 8,645,923 B1 | 2/2014 | Satish et al. |
| 8,677,494 B2 | 3/2014 | Edery et al. |
| 8,832,836 B2 | 9/2014 | Thomas et al. |
| 8,910,238 B2 | 12/2014 | Lukacs et al. |
| 9,141,794 B1 | 9/2015 | Soubramanien et al. |
| 9,202,048 B2 | 12/2015 | Sallam |
| 9,355,247 B1* | 5/2016 | Thioux .............. G06F 21/53 |
| 9,411,953 B1 | 8/2016 | Kane et al. |
| 9,516,055 B1 | 12/2016 | Liu |
| 9,836,604 B2 | 12/2017 | Coronado et al. |
| 9,990,497 B2 | 6/2018 | Spernow et al. |
| 10,210,329 B1* | 2/2019 | Malik ................ H04L 63/1466 |
| 10,685,110 B2 | 6/2020 | Das |
| 10,873,589 B2 | 12/2020 | Cheetancheri |
| 10,902,122 B2 | 1/2021 | Das |
| 11,151,252 B2 | 10/2021 | Das |
| 11,232,201 B2 | 1/2022 | Das |
| 2002/0009079 A1 | 1/2002 | Jungck et al. |
| 2003/0033542 A1 | 2/2003 | Goseva-Popstojanova et al. |
| 2003/0140248 A1* | 7/2003 | Izatt ................. H04L 63/0227 726/11 |
| 2006/0224724 A1 | 10/2006 | Marinescu et al. |
| 2007/0157203 A1 | 7/2007 | Lim |
| 2007/0261112 A1 | 11/2007 | Todd et al. |
| 2008/0016339 A1 | 1/2008 | Shukla |
| 2009/0070876 A1 | 3/2009 | Kim et al. |
| 2010/0024033 A1* | 1/2010 | Kang ................. H04L 63/1466 726/23 |
| 2010/0185876 A1 | 7/2010 | Kim |
| 2010/0269171 A1 | 10/2010 | Raz et al. |
| 2011/0047620 A1 | 2/2011 | Mahaffey et al. |
| 2011/0078794 A1 | 3/2011 | Manni et al. |
| 2011/0277033 A1 | 11/2011 | Ramchetty et al. |
| 2012/0266243 A1 | 10/2012 | Turkulainen |
| 2013/0080625 A1 | 3/2013 | Morinaga et al. |
| 2013/0091584 A1 | 4/2013 | Liebmann et al. |
| 2014/0181976 A1 | 6/2014 | Snow et al. |
| 2014/0208426 A1 | 7/2014 | Natarajan et al. |
| 2014/0215621 A1 | 7/2014 | Xaypanya et al. |
| 2015/0089651 A1 | 3/2015 | Mirski et al. |
| 2015/0096018 A1 | 4/2015 | Mircescu |
| 2015/0096022 A1 | 4/2015 | Vincent et al. |
| 2015/0227742 A1 | 8/2015 | Pereira |
| 2016/0098560 A1 | 4/2016 | Friedrichs et al. |
| 2016/0099963 A1 | 4/2016 | Mahaffey et al. |
| 2016/0357958 A1 | 12/2016 | Guidry |
| 2016/0378640 A1 | 12/2016 | Hron |
| 2017/0171240 A1 | 6/2017 | Arzi et al. |
| 2017/0289176 A1 | 10/2017 | Chen et al. |
| 2017/0329621 A1 | 11/2017 | Beckett |
| 2018/0018459 A1 | 1/2018 | Zhang et al. |
| 2018/0052720 A1* | 2/2018 | Ionescu ................. G06F 9/542 |
| 2019/0052651 A1 | 2/2019 | Cheetancheri |
| 2019/0065740 A1 | 2/2019 | van Riel et al. |
| 2019/0114421 A1 | 4/2019 | Das |
| 2019/0205537 A1 | 7/2019 | Das |
| 2019/0236275 A1 | 8/2019 | Das |
| 2019/0342313 A1 | 11/2019 | Watkiss et al. |
| 2019/0347413 A1 | 11/2019 | Dubrovsky et al. |
| 2019/0354680 A1 | 11/2019 | De Lima, Jr. et al. |
| 2021/0185062 A1 | 6/2021 | Cheetancheri |
| 2022/0035919 A1 | 2/2022 | Das |
| 2022/0222343 A1 | 7/2022 | Dubrovsky et al. |

FOREIGN PATENT DOCUMENTS

| | | |
|---|---|---|
| WO | WO 2019/032702 | 2/2019 |
| WO | WO 2019/075388 | 4/2019 |
| WO | WO 2019/133637 | 7/2019 |
| WO | WO 2019/222261 | 11/2019 |

OTHER PUBLICATIONS

European Application No. 18894474.8 Extended European Search Report dated Aug. 3, 2021.
U.S. Appl. No. 17/128,639, Senthill Cheetancheri, Real-Time Prevention of Malicious Content via Dynamic Analysis, filed Dec. 21, 2020.
Software Instrumentation, Wiley Encyclopedia of Computer Science and Engineering, edited by Benjamin Wah. Copyright 2008 John Wiley & Sons, Inc.
PCT Application No. PCT/US2018/045814 International Search Report and Written Opinion dated Oct. 19, 2018.
PCT Application No. PCT/US2018/055694 International Preliminary Report on Patentability dated Apr. 14, 2020.
PCT Application No. PCT/US2018/055694 International Search Report and Written Opinion dated Feb. 11, 2019.
PCT Application No. PCT/US2018/067541 International Search Report and Written Opinion dated Mar. 27, 2019.
PCT Application No. PCT/US2019/032283 International Search Report and Written Opinion dated Sep. 12, 2019.
U.S. Appl. No. 15/671,445 Office Action dated May 14, 2020.
U.S. Appl. No. 15/671,445 Final Office Action dated Aug. 15, 2019.
U.S. Appl. No. 15/671,445 Office Action dated Feb. 25, 2019.
U.S. Appl. No. 15/783,793 Office Action dated Apr. 16, 2019.
U.S. Appl. No. 15/783,793 Final Office Action dated Dec. 11, 2019.
U.S. Appl. No. 15/783,793 Office Action dated Jun. 28, 2019.
U.S. Appl. No. 15/858,785 Office Action dated Sep. 6, 2019.
U.S. Appl. No. 15/890,192 Office Action dated Jun. 11, 2020.
U.S. Appl. No. 15/890,192 Final Office Action dated Jan. 21, 2020.
U.S. Appl. No. 15/890,192 Office Action dated Oct. 4, 2019.
U.S. Appl. No. 16/055,958 Office Action dated Apr. 21, 2020.
PCT Application No. PCT/US2019/032283 International Preliminary Report on Patentability dated Nov. 17, 2020; 9 pages.
PCT Application No. PCT/US2018/045814 International Preliminary Report on Patentability dated Feb. 11, 2020.
PCT Application No. PCT/US2018/067541 International Preliminary Report on Patentability dated Jun. 30, 2020.
U.S. Appl. No. 15/783,793 Final Office Action dated Oct. 14, 2020.
U.S. Appl. No. 16/055,958 Final Office Action dated Oct. 9, 2020.
Nethercote, Nicholas; "Dynamic binary analysis and instrumentation", Technical Report, UCAM-CL-TR-606, ISSN 1476-2986, Nov. 2004.
"XOR Cipher—Wikipedia", Mar. 19, 2017, XP055758581, Retrieved from the Internet: URL:https://en.wikipedia.org/w/index.php?title=XOR_cipher&oldid=771112755 [retrieved on Dec. 9, 2020].
European Application No. 18844091.1 Extended European Search Report dated Jan. 19, 2021.
U.S. Appl. No. 15/783,793 Office Action dated Feb. 22, 2021.

* cited by examiner

DETECTION OF EXPLOITATIVE PROGRAM CODE

CROSS-REFERENCE TO RELATED APPLICATIONS

This application claims the priority benefit of U.S. patent application Ser. No. 15/858,785 filed Dec. 29, 2017, the disclosure of which is incorporated herein by reference.

BACKGROUND OF THE INVENTION

Field of Invention

The present invention generally relates to identifying whether computer data includes malicious content. More specifically, the present invention relates to identifying whether application program code performs uncharacteristic behavior at runtime of after an application program receives information relating to that application program.

Description of the Related Art

One of the greatest threats to privacy and to secure computer data are various sorts of computer malware, such as computer viruses or eavesdropping software. Generally malware can be any software program that includes code that executes without the knowledge or authorization of an owner or user of a computing device. In certain instances, received computer information may cause an application program executing at a computer to behave in uncharacteristic ways.

Malware is typically distributed by parties with nefarious intent. Malware is commonly used steal or destroy computer data or to snoop or spy the actions of a user when the user operates a computer. Malware is also frequently used to damage a computer or to damage computer data. For example malware may be used to steal personal or financial information, blackmail computer users by denying access to their own data unless or until a fee is paid, or to damage infected computers by damaging data stored on those infected computers. Malware can reside in sets of data packets transferred between computers or can reside in a data storage device in the form of a file, in a computer message, or reside in other sets of computer information, for example.

Furthermore, newly developed malware is increasingly difficult to identify. Frequently, until a particular sort of malware has been identified and characterized, conventional techniques that identify whether a communication includes malware can miss detecting the presence of that malware in a set of computer data. This may occur when information in one or more received data packets is hidden or when the malware is not identifiable by a signature associated with the information in the received data packets.

Presently thousands of new malware samples are discovered all over the internet each day. According to the popular malware detection website Virustotal.com, an average number of unique malware samples identified daily are above 800,000. This huge number of malware samples traversing the internet poses a significant challenge for detection using known pattern matching methods employed by traditional anti-malware solutions.

Significantly, almost all the new malware samples we observe each day are actually repackaged versions of known malware. Individuals that generate malware today often obfuscate the presence of malicious code by packing it within other executable code or by compressing it. In certain instances this is performed using binary packing software or a form of software that is referred to as "protector" software. This packing or "protecting" function may reorganize or manipulate a piece of original malware code into a structure that cannot be detected using conventional packet scanning. As such, repackaged versions of old malware successfully evade detection when conventional scanning techniques such as deep packet inspection (DPI) are used. DPI relies on pattern matching data included in a set of data packets with attributes associated with or signatures generated from previously identified malicious code.

When a repackaged malware is received and is executed by a computing device, that malware may reveal (unpacks) its internal malicious code and associated data in process memory where the malicious code is then executed by a processor at the computing device. The difficulty in detecting repackaged malware is compounded by the fact that memory extraction of code and data does not generate operating system events, such as a system call or call-backs which can be intercepted externally. Hence, malicious code can silently be extracted, executed, and removed from memory.

Malware may also attempt to exploit a flaw or bug in a set of program code that resides at a computer. As such, information received from another computer may attempt to exploit a flaw in an application program when attempting to perform a malicious act.

Since malware can and is used by those to steal or destroy computer data and since repackaged malware can avoid detection when conventional techniques are used, what are needed are detection methods that do not depend on the content of a set of computer data.

Another conventional approach for identifying actions performed by a processor executing instructions out of a memory involves dumping memory and analyzing the content of memory at a point in time. In certain instances, such memory dumps may be performed after a malware causes a computer to crash or to perform another malicious act. Identifying the presence of malware in a data set by examining data included in a memory dump is much like sorting through heaps of forensic evidence that may or may not be related to malicious activity. This is because at the time of the memory dump, memory would include data related to normal or expected computer program activity and may include data associated with malware. A practitioner may have little to no ability to identify what data was necessarily normal/expected or what data was associated with malware. In such instances, a practitioner may not be aware of which instructions actually performed a malicious act. Hence, we need a memory detection solution which can correctly identify the point at which the malicious code is available in memory for detection such that malicious acts can be observed as program code executes at run-time. What are also needed are detection methods and apparatus that analyze actions performed by malicious code while remaining unobserved (undetected) by the malicious code itself.

SUMMARY OF THE CLAIMED INVENTION

The presently claimed invention relates to a method, a non-transitory computer readable storage medium, or an apparatus executing functions consistent with the present disclosure for preventing malicious content from affecting the operation of a computer. A method consistent with the present disclosure may be performed by a processor that runs potentially exploitative code as a child process out of a memory, the potentially exploitative code may be associated with a set of program code, and the processor may then receive computer information that is associated with the set of program code. The received computer information may include data and information associated with internal structures associated with the set of program code. Next the method may analyze the data and the information associated with the internal structures associated with the set of program code as the potentially exploitative code is run as the child process, identify that the data and the information associated with the internal structures is consistent with suspicious activity, and classify the received computer information as being suspicious when suspicious activity is observed.

When the presently claimed invention is implemented as a non-transitory computer readable storage medium, a processor executing instructions out of a memory may run potentially exploitative code as a child process out of a memory, the potentially exploitative code may be associated with a set of program code, and the processor may then receive computer information that is associated with the set of program code. The received computer information may include data and information associated with internal structures associated with the set of program code. Next the method may analyze the data and the information associated with the internal structures associated with the set of program code as the potentially exploitative code is run as the child process, identify that the data and the information associated with the internal structures is consistent with suspicious activity, and classify the received computer information as being suspicious when suspicious activity is observed.

An apparatus consistent with the present disclosure may include a processor that executes program code out of a memory. The processor when executing the program code may run potentially exploitative code as a child process out of a memory, the potentially exploitative code may be associated with a set of program code, and the processor may then receive computer information that is associated with the set of program code. The received computer information may include data and information associated with internal structures associated with the set of program code. Next the method may analyze the data and the information associated with the internal structures associated with the set of program code as the potentially exploitative code is run as the child process, identify that the data and the information associated with the internal structures is consistent with suspicious activity, and classify the received computer information as being suspicious when suspicious activity is observed.

DETAILED DESCRIPTION

Figure 1:
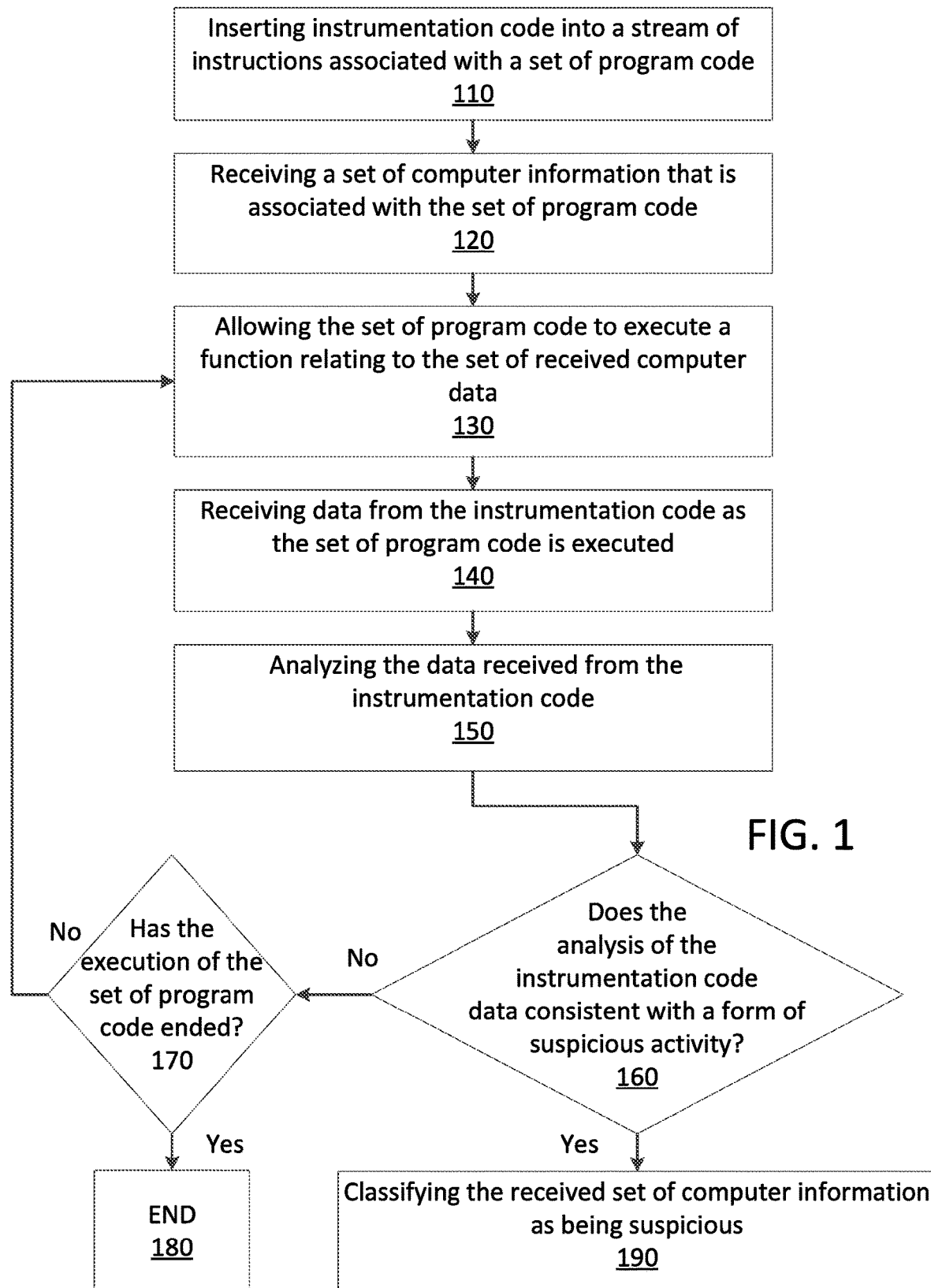
FIG. 1 illustrates an exemplary method where instrumentation code is used to monitor the operation of a set of program code when that program code is affected by external inputs.

The present disclosure is directed to monitoring internal process memory of a computer at a time with program code executes. Methods and apparatus consistent with the present disclosure monitor the operation of program code (executable code or application program code, for example) with the intent of detecting whether program inputs may exploit vulnerabilities that may exist in the program code at runtime. By detecting suspicious activity or malicious code that may affect internal process memory at run-time, methods and apparatus described herein identify suspected malware based on suspicious actions performed as program code executes. Runtime exploit detection may detect certain anomalous activities or chain of events in a potentially vulnerable application during execution. These events may be detected using instrumentation code when a regular code execution path of an application is deviated from. For example, as shellcode, microcode, or assembly language takes over execution control of processes executed at a computing device. Alternatively or additionally malicious/suspicious memory contents may be identified using scanning and pattern matching techniques. Methods and apparatus consistent with the present disclosure may use instrumentation code that remains transparent to an application program that the instrumentation code has been injected into.

Malicious code may consist of instructions written as a low level scrip, such scripts, for example, may be written in machine code or assembly language and may be considered a form of what is commonly referred to "shellcode." While the term shellcode was originally coined to refer to program code that starts with a "command shell" that may include a user interface that accesses services of an operating system software, "shellcode" may also perform malicious acts via a command line interface or a graphical user interface (GUI). Such command shells or shellcode may form a layer around operating system code, that is adjacent to operating system code in a code stack, or that communicates with the kernel of an operating system. Shellcode may include a payload of instructions that attempt to exploit a vulnerability of a set of application program code. Those of ordinary skill in the art will understand that the term "shellcode" is not limited to the spawning of a shell, because functionality of a payload may not itself be limited to initiating an interactive programming operation or to initiating a particular operation. The term shellcode may instead refer to actions performed by a set of malicious code in totality and not be limited to initiating a function.

Processes consistent with the present disclosure may execute potentially vulnerable program code as a child process in a detection framework. SonicWALL Inc., for example has developed a runtime exploit detection framework that is referred to as "Victor." Since child processes are processes created by a parent process, such a runtime exploit detection framework may inject probes as child processes that detect whether an application program, when executed, meets certain conditions or criteria when executed. These probes may be categorized based on whether they trigger processes relating to the grabbing control of a host application by a piece of shellcode, for example. As such, probes that collect information when monitoring operations of program code may be child processes generated within a runtime exploit detection framework. Child processes are software sub-processes that are typically created by a software "parent" process that may be a main process that can create several child processes. While a parent process may have many child processes, a particular child process will typically be associated with only a single parent process.

Methods and apparatus consistent with the present disclosure may detect exploits at runtime via the exploit detection framework using techniques that are similar to those that are referred to as a dynamic binary instrumentation (DBI) framework. As such, exploit detection framework tools, such as SonicWALL's "Victor" may be used to analyze actions performed by a given set of computer program code using techniques that are similar to DBI. Tools, such as, SonicWALL's "Victor" may, thus be used when analyzing the behavior of a binary application at runtime through the injection of instrumentation code, like the aforementioned probes. This instrumentation code executes as part of the native instruction stream after being injected. Rather than considering what may occur, dynamic binary analysis has the benefit of operating on what actually does occur. While not necessarily exhaustive in terms of exercising all code paths in an application, DBI provides detailed insight into an application's concrete execution state when program code is tested for possibly including exploitive code.

The instrumentation code can remain entirely transparent to an application that it's been injected into, the instrumentation code may be used to pass context information relating to the behavior of that software application as it executes in real-time. As such, processes performed by an application program may be monitored by a processor executing code that analyzes what the application program does by reviewing the context information passed from the instrumentation code. This context information includes, yet is not limited to the content of certain computer registers, parameters associated with a process performed by a processor executing code of the application, the content of certain memory locations, information that relates to the state of a memory, or information relating to the allocation of memory or other potentially malicious actions. Analysis of an application at runtime using binary instrumentation makes it possible to gain insight into the behavior of a particular application including internal central processing unit (CPU) registers and memory state of the application throughout its execution. As such, the detection of malware by DBI highlights one of the key differences between detecting potential exploits via an exploit detection framework using DBI techniques instead of conventional static binary analysis.

Note that program code may be associated with a different set of contextual information than a set of contextual information that is associated with analysis code that may be used to analyze the program code. As such, a set of program code may be associated with a first set of contextual information and analysis code may be associated with a second set of contextual information. These different sets of contextual information may be related to different distinct process of the program code and of a set analysis code. This may be true even when the analysis code analyzes the real-time execution of the program code. Analysis code consistent with the present disclosure may execute as a background task that is an independent process from a process associated with the execution of program code. In certain instances, this analysis code may poll memory associated with program code using techniques associated with a DBI framework. Alternatively or additionally analysis code may analyze data stored in memory by scanning the contents of memory with techniques associated with deep packet inspection (DPI). As such, analysis software may identify malicious or suspicious code via instrumentation code that matches program code contexts to criteria that is associated with suspicious code. Furthermore, analysis software may identify malicious code by matching signatures associated with known malware with data stored in memory.

FIG. 1 illustrates an exemplary method where instrumentation code is used to monitor the operation of a set of program code when that program code is affected by external inputs. In step 110, instrumentation code instructions are inserted into a stream of program code. The insertion of the instructions into the stream of program code in step 110 may be performed using a framework, such as the dynamic binary instruction (DBI) framework discussed above. Next, in step 120 of FIG. 1 a set of computer information that relates to the set of program code is received. The data received in step 120 of FIG. 1 may relate to any sort of function performed by or associated with the set of program code. For example, received data may be a request to access application program information at a computing device. The computer information received in step 120 may be any sort of communication sent from an external computing device that is received by a computer that executes the set of program code. As such, the received computer information may be a communication, a message, an email, a command, or may include login or other information.

After step 120, step 130 of FIG. 1 may allow the set of program code to execute one or more functions that relate to the set of received computer information.

Then in step 140 data may be received from the instrumentation code inserted into the set of program code. For example, when the information received in step 120 is a message that includes malicious code and the set of program code is allowed to receive that message in step 130, context information relating to the set of program code may be received from the instrumentation code in step 140. The context information received in step 140 may then be analyzed to see whether the computer information received in step 120 appears to attempt to exploit a vulnerability in the set of program code. The data/context information received in step 140 may include the content of certain computer registers, parameters associated with a process performed by the set of program code, or information relating to the state of memory. After the data/context information is received in step 140, that data/context information may be analyzed for suspicious activity in step 150.

Next, determination step 160 may identify whether the instrumentation code data is consistent with suspicious activity performed by the set of program code as that program code operates. For example, when the set of program services a function associated with the information received in step 120. When determination step 160 identifies that the instrumentation code data is not consistent with suspicious activity, program flow may move from step 160 to determination step 170 that may identify whether the execution of the set of program code has ended, when yes, program flow may move from step 170 to step 180 where the program flow ends. When determination step 170 identifies that the set of program code has not completed executing, program flow may move from step 170 back to step 130 where the execution of the set of program code is allowed to continue.

When determination step 160 identifies that the instrumentation code data is consistent with the suspicious activity, program flow may move from step 160 to step 190, where the received set of computer information may be classified as being suspicious. In an instance where the computer information received in step 120 was the message that includes the malicious code (discussed above), that malicious code may attempt to exploit a vulnerability in the set of program code by causing information included in that message to be executed as executable program code by a processor. In such an instance, the set of program code would not be aware that the set of program code was being exploited. A vulnerability included in the set of program code may be prevented from being exploited by identifying that an indicator or flag associated with memory locations storing non-executable program data has been changed to indicate that those memory locations store executable code. As such, the loading of data into memory followed by flagging that data as including executable instructions can be used to identify suspicious activity.

In certain instances shellcode, machine code, or assembly language code may be a first piece of malicious code that when executed suggests that at least one "vulnerability" in an application program has been encountered. The probes injected via the exploit detection framework may be used to detect when such code is about to be executed, thereby, detecting potential vulnerabilities before they can perform a malicious act. These probes may accomplish this task by providing information to the exploit detection framework by identifying that a machine code instruction is about to be executed, that an assembly language instruction is about to be executed, that an operating system function/command is about to be executed, or that a function associated with the kernel of an operating system is about to be accessed.

Figure 2:
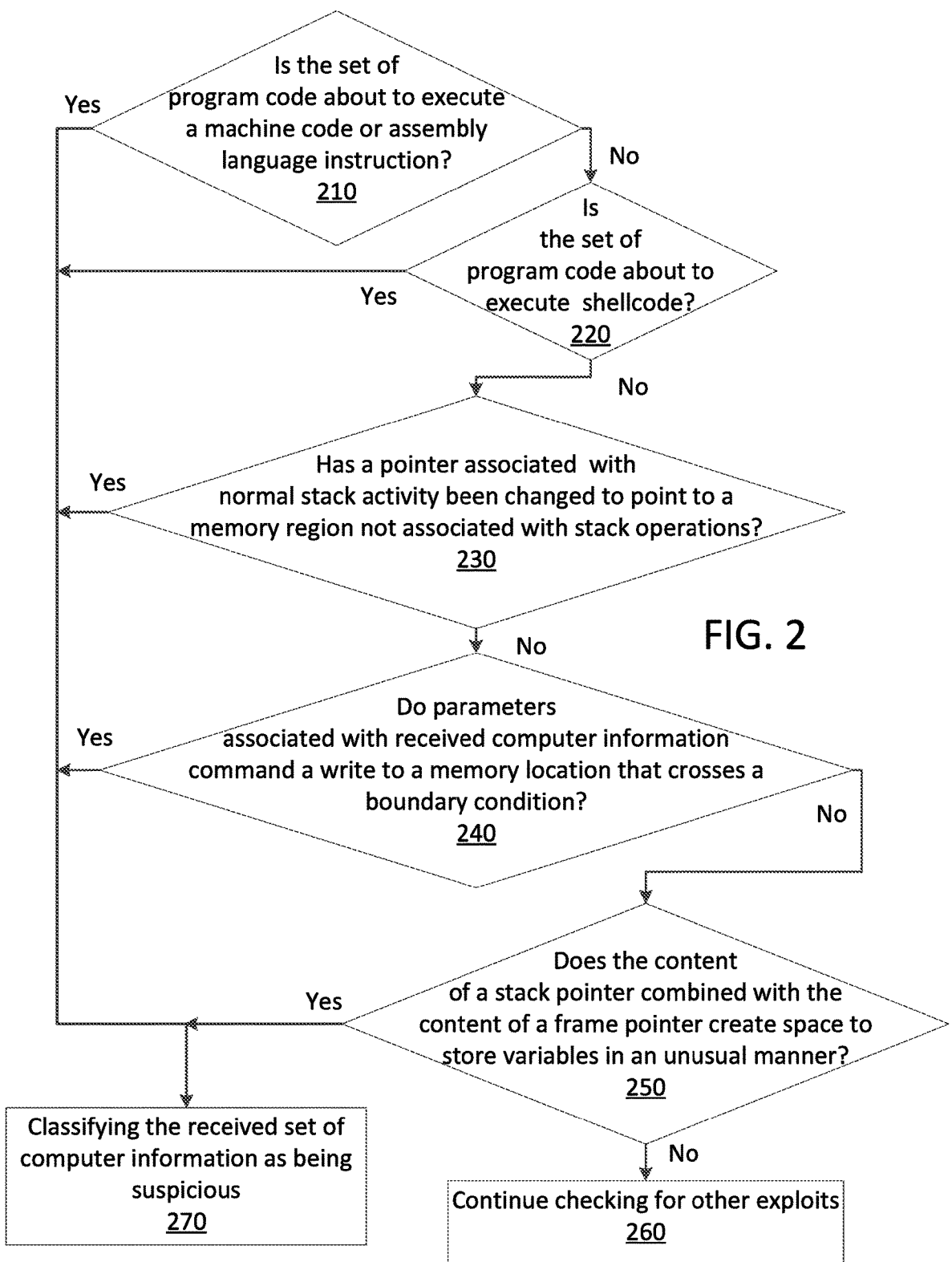
FIG. 2 illustrates an exemplary set of actions that may be used to identify whether a set of program code performs suspicious activity after that set of program code receives a set of computer information.

FIG. 2 illustrates an exemplary set of actions that may be used to identify whether a set of program code performs suspicious activity after that set of program code receives a set of computer information. Step 210 of FIG. 2 may identify whether machine code or an assembly language instruction is about to be executed by a set of program code. When yes, program code may move from step 210 to step 270 where the set of received computer information may be classified as being suspicious.

When step 210 does not identify that machine code or assembly language instructions are about to be executed, program flow may move from step 220 to step 230. Step 230 may than identity whether a set of shellcode is about to be executed. When step 220 identifies that shellcode is about to be executed, program flow may move from step 220 to step 270 where the set of received computer information may be classified as being suspicious.

Methods and apparatus consistent with the present disclosure may be used to identify tricks that malware may employ when attempting to exploit a potential vulnerability. Exploitive code may be identified by detecting operations relating to a "stack pivot," a "call stack sanity" operation, a "call stack back" tracing function, or an action that causes code in a process "heap" memory or in "stack" memory to become executable code.

A memory "heap" may be a region of memory that is not tightly managed by a processor in a computer system. Heap memory may be allocated using by a set of program code using commands, such as, "malloc ( )" or "calloc ( )" commands, where allocated heap memory may be deallocated using a command, such as, the "free ( )" command. In contrast, stack memory is a region of memory that typically is managed and optimized by a processor of a computer system. Stack memory is commonly used to store variables created by stack related functions, these stack related functions may be functions implemented by operation system program code. Commonly, stack memory is implemented using a first in first out data structure. Typically, when a function that uses stack memory ends, all variables associated with that stack related function will be freed by the processor of a computer system all at once.

A "stack pivot" is an exploit that moves a stack pointer from pointing to a normal stack memory region to another region of memory. The action of moving or changing the stack pointer to point to the abnormal region of memory is referred to as a "stack pivot" because it may cause program code to execute in a manner not typical of a "normal" stack command, as such, the changing of the pointer causes program code to pivot to point (switch away from pointing) to memory locations that are not associated with a range of stack memory addresses. A "stack pivot" may be considered an exploit of a class of exploits that are referred to as "return-oriented programming" (ROP), where malicious code hijacks a set of program instructions. In certain instances, malicious code associated with an ROP function ends in a return instruction that may be located in a subroutine associated with an existing set of program code or with a set of library code.

Vulnerabilities associated with ROP functions may also be referred to or be implemented as a "stack smashing" attack, where malicious code manipulates stack instructions by taking advantage of a bug (an unintended fault/flaw) included in a set of program code. Assume for a moment that a set of program code has been allocated 1000 bytes of memory spanning memory addresses 1000 to 2000. Assume also that malicious code issues a write command to that set of program code beginning at memory address 1500 that includes 1000 bytes of data. In an instance where that set of program code does not compare parameters relating to that received command and performs that command, memory outside of memory addresses 1000 to 2000 will be written to. This is an example of flawed program code that suffers from an overrun or a buffer overrun vulnerability. Buffer overruns may cause more input data to be received that cannot be "properly" stored because they can cause memory locations to be overwritten that include data or code that is related to another process. In such instances, commands in a command stack can be improperly overwritten with malicious instructions and those instructions when executed may attack a computer executing them. Because of this "stack pivot" attacks or "stack smashing" attacks may cause data or commands in a memory stack to be overwritten improperly.

One way in which operations relating to a "stack pivot" attack may be identified is by an exploit detection framework that is aware of memory regions that are associated with "normal" stack functions. By using DBI techniques, an exploit detection framework can receive information regarding instructions that are about to be executed. In an instance where a next instruction to be executed is identified to be located in a memory address space that is not associated with known or expected stack function, the exploit detection framework may identify that a "stack pivot" attack is about to be initiated by malicious code. For example, when a "correct" stack address range/region is typically pointed by a second and a third unsigned integer of a thread's environmental block, a probe may be used to identify when a stack pointer points away from the expected stack region pointed by the second and third unsigned integer of the thread's environmental block (TEB). Thread environmental blocks commonly store information relating to a currently running program thread. Those of ordinary skill in the art would understand that a thread is a small sequence of programming instructions that may be managed by a scheduler that may be implemented in operating system software. When a TEB stores information relating to memory addresses that are known to be associated with a normal (or expected) memory address range, the information in the TEB may effectively be used to set boundaries when identifying whether certain commands correspond with normal or expected program activity or whether program functions/actions do not correspond to abnormal program activity that may be associated with suspicious or malicious code. When a stack pointer points to a memory address that are outside of a known stack memory address range accessed by a set of program code, the received computer information relating to that set of program code may be identified attempting to exploit a vulnerability/flaw/bug in that set of program code. As such, the received computer information may be used to identify suspicious or malicious acts performed by an application program when functionality of that application program has been altered via information received at a computing device.

Normal or expected program code operation may be associated with a set of contextual data that identifies boundaries of program code activity. For example, when a process of an application program has been allocated a certain specific memory region for storing executable code, and instrumentation code observes that that application program is attempting to access executable code in a memory location outside of that certain specific memory region, that application program could be identified as acting abnormally.

In order to detect a stack pivot, context information received from instrumentation code may be used to identify whether a pointer associated with normal stack activity has been changed to point to a memory region that is not associated with known stack operations in step 230 of FIG. 2. When step 230 identifies that a pointer has changed to point to an inappropriate memory location, program flow may move from step 230 to step 270 where the set of received computer information may be classified as being suspicious.

When step 230 does not identify that a pointer has been changed inappropriately, program flow may move to step 240 that identifies whether parameters associated with the received computer information command a write to a memory location that crosses a boundary condition.

In yet other instances, ROP attacks may pivot a stack pointer to point to a memory location that is still included within an expected range of memory addresses. In such instances, the malicious code identification technique that identifies a "stack pivot" attack by identifying inappropriate memory accesses could fail to detect malware. In such instances, a probe that reviews contents of the stack pointer and the content of a frame pointer may be used to detect malware. Since, in assembly level programming the stack pointer and the frame pointer often work in unison to create space for local function variables, the stack pointer, the frame pointer, and function variables can be used to identify possible malicious activity. As such, the stack pointer and the frame pointer may be used when performing a sanity check on stack operations and locations where stack variables are stored. Such a "stack sanity" probe can be used when back tracing these stack frames. Because of this, the analysis of context information relating to pointers and variables may be used to identify whether certain stack operations meet operational expectations and are therefore "sane" or be used to identify whether program code operation is about to perform a suspicious act. An example of back-tracking a stack may include following function return addresses all the way back to an originally caller or calling program. While this following of the function return addresses are performed, data located on the stack that are associated with each function call may be examined when identifying whether a set of program code performs suspicious activity.

Step 250 of FIG. 2 may identify whether content of a stack pointer combined with the content of the frame pointer create space to store variables in an unusual or unexpected manner. When unusual activity is identified in step 250, program flow may move from to step 270 that classifies the received computer information as being suspicious. Examples of such unusual activity include a) a local variable or function argument that are declared right next to each other in a function, b) a local variable or function argument that are not right next to each other in a stack memory, or c) a local variable or function argument are not in a correct location relative to a function return address.

When the stack pointer and frame pointer contents do not appear to be related to creating or storing variables in an unusual manner, program flow may move from step 250 to step 260 where additional tests may be performed when checking to see if a set of received computer information includes exploitative code.

In certain instances, instrumentation code may be used to identify sets of normal or expected program code activity by executing that program code after various known good inputs are provided to that program code. In such an instance, the instrumentation code could collect context information related to "exploit free" program code operation. As such, normal/expected program code operation may be associated with a set of exploit free context information that is stored in a database. In such instances, this exploit free context information may be used to identify one or more sets of expected program code activity. The gathering of this exploit free information or the analysis of that information may be used to train instrumentation and analysis code to detect abnormal program behavior. Because of this the scope of "expected" actions of a set of program code may be learned. Whenever unexpected behavior is observed, subsequent analysis of that program activity may be used to identify whether an application program is vulnerable or may be used to train instrumentation code to identify normal program code activity more comprehensively. In instances where vulnerabilities are identified, information gathered by the instrumentation code may be used to immunize (patch or fix) that program code from that exploit before a computer or computer data are exploited by a previously unknown vulnerability.

Yet another ROP exploit may be associated with making the content stored in a region of memory (heap) or in stack memory executable, when that heap of memory is not expected to store executable instructions. To detect whether the content of a heap or locations in stack memory are converted to executable code (rather than being simply used to store data) may be identified with yet another probe method. Instrumentation code consistent with the present disclosure may track memory addresses that have been allocated to store executable code and non-executable data, for example. When a processor executing that instrumentation code identifies that memory that was allocated to store data was later flagged as including executable code, that processor may identify that the set of program code may suffer from a vulnerability that malicious code can potentially exploit. Since modern software programs should not have executable code located in a stack memory region, the identification that the stack includes executable code may be used to identify suspicious activity is being performed by a set of program code.

Figure 3:
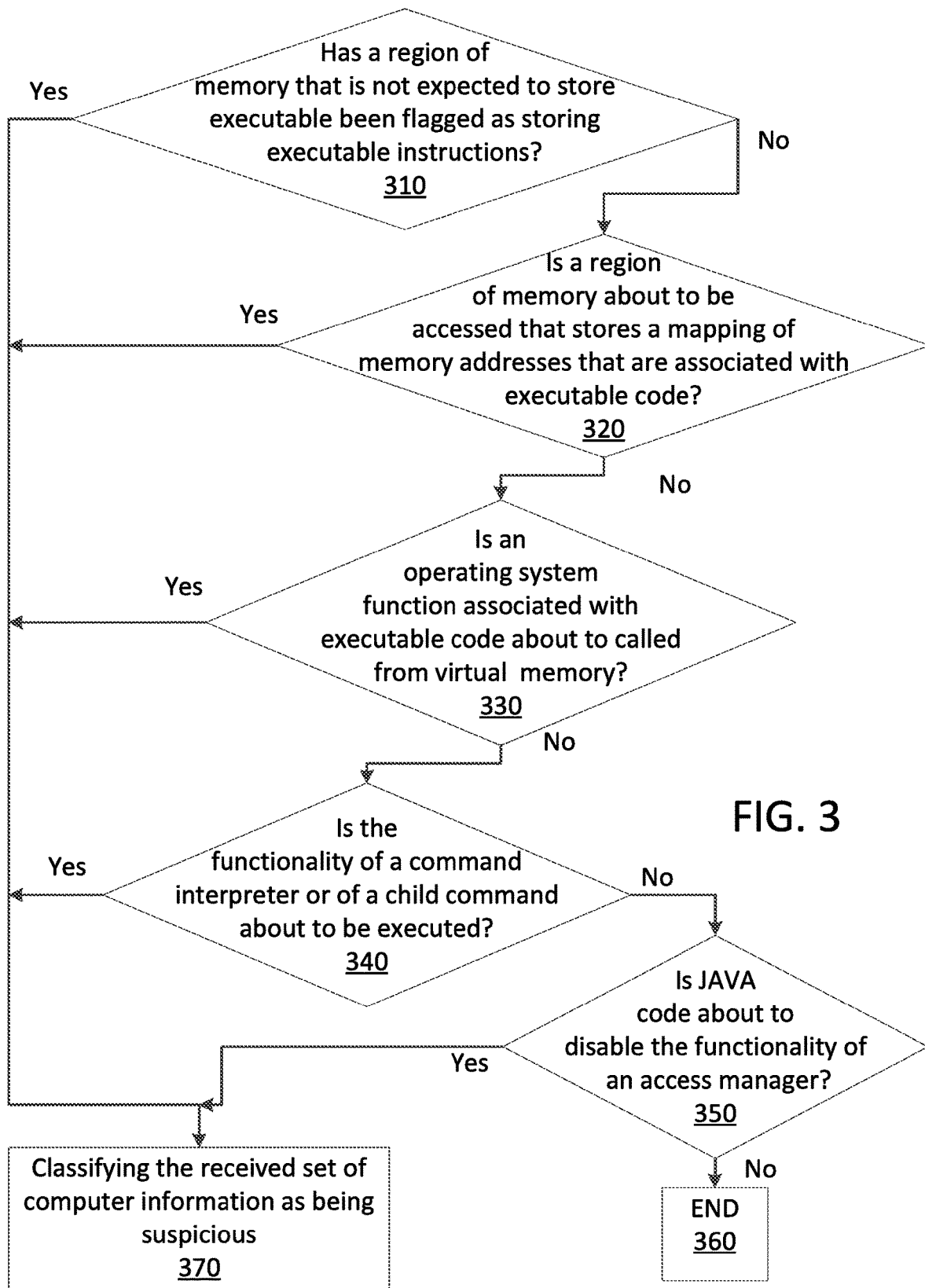
FIG. 3 illustrates another exemplary set of actions that may be used to identify whether a set of program code performs suspicious activity after that set of program code receives a set of computer information.

FIG. 3 illustrates another exemplary set of actions that may be used to identify whether a set of program code performs suspicious activity after that set of program code receives a set of computer information. Step 310 may identify whether a region of memory that is not expected to store executable data has been flagged as storing executable instructions. When yes, program flow may move to step 370 that classifies the received data set as being suspicious.

In certain instances, malicious shellcode may be a position independent code that performs potentially malicious acts by first identification of memory locations associated with system libraries, such as a Windows kernel32.dll. Malicious code may then use this library information to identify memory locations associated with different application program interfaces (APIs) are located and then call one or more of those APIs when performing malicious acts. Alternatively, malicious code could overwrite memory locations that store executable code associated with an API.

A process environment block (PEB) is an operating system data structure that once allocated may keep accounting information relating to a computer process. In certain instances, data included in a PEB may include a double linked list of all executable images that are present in an address space associated with a computer process. Malware potentially could use information stored in a PEB to discover memory address where system libraries reside in memory. Probes or instrumentation code consistent with the present disclosure may detect that program code being executed enumerates (or is parsing/evaluating) the content of a PEB possibly with malicious intent. As such, the parsing and or evaluating of a PEB may cause a set of program code to be characterized as malware or potential malware. Step 320 of FIG. 3 may identify whether a region of memory is about to be accessed that stores a mapping of memory addresses that are associated with different pieces of executable code. When step 320 of FIG. 3 identifies that a map of executable code has been accessed by a set of program code that does not require knowledge of the locations where other sets of executable code reside, program flow may move from step 320 to step 370 where the set of received computer information may be classified as being suspicious. As such, step 370 may be classify the received computer information as being suspicious after a PEB has been parsed by the set of program code. As such, the accessing of the Windows kernel32.dll by a set of program code may indicate that that set of program code is being influenced (hijacked) by malicious code.

Any memory location where an executable image like a dynamic linked list (DLL) or executable program (EXE) is loaded has a memory page flag called MEM_IMAGE set. The calling of the MEM_IMAGE set function or another operating system functions can be used to identify whether program code is running from virtual memory allocated during execution. Here again, a probe could identify that malicious code may be present when APIs like MEM_IMAGE are called. As such, the presence of malware may be identified by observing accesses to memory regions that are associated with certain APIs or with certain operating system functions. Such determinations may be made based on a virtual memory address or based on a physical memory address that is associated with a specific API. Because of this, step 330 may identify whether program code is about to access an operating system function from virtual memory. When the set of program code is about to access an operating system function from virtual memory, program flow may move to step 370 where the set of received computer information may be classified as being suspicious.

Another form of malicious attack that can be detected using probes and instrumentation code is by identifying that program code is about to be executed out of a temporary directory. When malicious code is identified as being executed out of a temporary directory, potential malicious activity may be identified based on that executable code being present in the temporary directory. Here again, potentially malicious code may be identified before or during execution of that potentially malicious code. Alternatively or additionally, an act relating to loading executable program code into the temporary directory may be an indication that a certain set of program code may include malicious code. While not illustrated in FIG. 3, when executable code is about to be executed from a temporary directory may also be used to identify that a set of program code is being inappropriately influenced or hijacked.

The execution of a command interpreter or child command may also be indicative that malware is present in a set of program code or shellcode. Here again, a probe or instrumentation may be used to identify that the function of a command interpreter or child command has been or will be initiated, where such an identification may be used when determining whether malware is present that may affect program code. Because of this step 340 of FIG. 3 may identify whether the set of computer information is suspicious based on the initiation of a command interpreter or based on the identification that a child command is about to be executed. When step 340 identifies that a command interpreter or a child command is about to be executed program flow may move to step 370 where the received computer information may be classified as suspicious. Alternatively, program flow may move from step 340 to step 350 where other determinations may be made.

Yet another potential exploit is related to the operation of a JAVA virtual machine (JVM). Java language provides legitimate methods to create child processes, but access to that interface is guided by the policies defined on the domain where the java code is executing. This domain policy is enforced by a component of the JVM called an access manager. In certain instances, a JVM exploit may disable this access manager via a vulnerability after which malicious code may use a legitimate child process creation interface to create a child process that includes malware. In such an instance, there is no shellcode to detect. Hence, a probe may be designed to independently detect whether a domain policy originally relating to an originally disabled creation process is accessed and may identify whether an access manager has been disabled. As such, the accessing of an access manager function relating to a previously disabled creation process may be indicative of the presence of malware. As such, step 350 may identify whether JAVA code is about to disable the functionality of an access manager, when yes program flow may move to step 370 where the received computer information may be classified as suspicious. Alternatively or additionally, the identification of a change of state relating to other JAVA domain policies may also be used to identify that an exploit is attempting to hijack JAVA program code. When step 350 identifies that an access manager relating to JAVA code is not accessed, program flow may end in step 360 of FIG. 3. Alternatively, additional tests may be performed when identifying whether a particular set of received computer information may be attempting to exploit a vulnerability in a set of program code executing at a computer.

Other types of exploits may relate to malware binaries that contain encrypted or obfuscated code that unpacks itself into memory during execution. Here again the unpacking of code may be associated with potentially suspicious activity and a potential exploit may be identified before malicious code is executed. The operation of unpacking the malware may include sending requests to the operating system to allocate additional memory or may include the use pre-allocated memory that is available on an executable process image loaded into memory. The newly allocated memory or the pre-allocated memory may include one or more memory pages that are or were allocated as part of a single memory allocation region. When computer data is loaded into a particular memory region, information relating to the use of that memory may be collected or observed by observation code consistent with the present disclosure. Typically, when memory is loaded with computer data, an operating system (OS) loader is invoked to actually perform the function of loading memory with that computer data. OS loaders are used to load executable programs, computer library data, or other data into memory. As such, the loading of data into a region of memory may be associated with one or more states that may be used by observation code as that computer data is evaluated for the presence of malware. States that may be consistent with the presence of malware may include the writing to a particular memory region by a particular compute process, an association of a particular compute process with a particular set of computer data, the invocation of an OS program loader, or the invocation of another OS function or command.

When malware that includes obfuscated or encrypted code, data may then be written to a newly allocated or previously allocated memory region. In certain instances, program code that includes obfuscated malware may first move or copy the obfuscated malware code and data into a memory location, where a processor executing that program code may de-obfuscate obfuscated malware before that malware is executed by the processor. Alternatively or additionally, program code that includes obfuscated malware may move or copy the malware related data to the memory as part of a de-obfuscation logical process. De-obfuscated malware may also be written to a particular memory region after the obfuscated malware has been de-obfuscated. Ultimately, the goal of computer hackers is to insert a Trojan (malicious code) into memory of a computing device where it can be executed as that Trojan performs an intended malicious activity.

Using a DBI framework, inserted program code can be used identify that a memory region is currently being allocated. The inserted program code may also access to information relating to all a set of pre-allocated memory that is associated with a certain computer process or set of computer data. As such, the DBI framework maintains visibility on memory regions as they are being written to. The DBI framework may also be aware of a current code execution path. All of this information may be used to identify that a particular memory region is being accessed that was previously written to. In an instance where a memory region has been overwritten since the region has been allocated to a particular process and consequently that same memory region is where the current code execution path reaches, then program code associated with the DBI framework can identify that dynamically unpacked code is being executed. In certain instances, the program code of the DBI framework may associate a set of computer data as being suspect of including malware after which data stored in the associated memory region can then be dumped as a file on disk for further analysis using known pattern matching techniques.

Methods and apparatus consistent with the present disclosure herein may also prepare data included in a set or stream of data packets for evaluations that may identify whether the malware is included in the data packet set.

The de-obfuscating of a set of computer data may include decrypting, reordering, or resequencing data included in that set of computer data. In certain instances, a portion of the data included in the set of computer data may be decrypted. The decryption may include XORing at least a portion of the data included in the data packet set with other data or with other data included in the data packet set. The decryption of the computer data may be associated with the possible presence of malware in that data set. As such, the XORing of data in a set of computer may cause a computer data set to be classified as possible malware.

An Example of reordering/resequencing received data includes reorganizing received data according to an interleaving process that reshuffles data or commands. Such a process is similar to shuffling a deck of cards where each card is equivalent to one or more data bits/bytes. In such instances, data from different portions of a data packet or from different packets sent between computers or data from a file may be reorganized forming an executable data set that may include malware. To accomplish this, code included in one or more data packets or in a file may include instructions for reordering data included in the data set after it is received. The execution of those instructions may generate malicious code from data that has intentionally been obfuscated to prevent a deep packet inspection (DPI) engine from detecting malware hidden within the data packet set.

The analysis of the data in the data packets may include executing program code included in the data packets and monitoring the execution of that program code when watching for unauthorized or suspicious actions performed by the program code. Unauthorized actions include, yet are not limited to writing to a boot block, updating a system registry, making changes to the file system, deleting computer data, copying data, transmitting data to another computer, or intercepting calls to a set of basic input/output instructions (BIOS) of a computer executing that program code. The intercepting of BIOS calls by the program code may be identified by observing program code replacing an original BIOS related command with another command or by observing that program code modifying parameters that were included in the original BIOS related command before the original BIOS command can be executed. As such, the analysis function may execute program code for the destination computer using a "Sandboxing" technique, thus allowing the program code to be evaluated for malware in a secure environment. In certain instances, methods and apparatus consistent with the present disclosure may combine "Sandboxing" with deep packet inspection (DPI). Once malware has been identified, signatures may be generated from the packet data for future use by processors that perform a DPI function. Sandboxing and DPI may be performed in parallel, thus detecting malware that has not been previously identified may be identified by a "Sandboxing" technique or detecting malware that has been previously identified may be identified via matching DPI techniques.

The analysis of data included in the data packet set may also observe the execution of program code and identify that the executed program code performs a function relating to organizing further instructions for execution from data included in the plurality of data packets. Once observed, this analysis may then classify this reorganization of data as an unauthorized action after which the data packet set or program code may be blocked or sequestered. As such, content included in a data set may be classified as malware based on how or what functions program code within that data set are performed.

Determinations relating to the identification of malware may also be based on a set of rules that identify what program behaviors are authorized or that are unauthorized. For example, a rule may be used to classify data within a data set as malware whenever data within that data set is reorganized/reshuffled or when data within that data set is manipulated or de-obfuscated by an XOR function. Alternatively another rule may indicate that the decryption of packet data is acceptable as long as it is performed in a manner consistent with a standard or expected type of decryption (such as decryption associated with a TCP communication). This other rule may also indicate that further analysis of program data is required after the decryption has been performed.

Even in instances where the reorganization of data is observed or other potentially malicious actions are detected, methods consistent with the present disclosure may include continuing the analysis of program code included in a set of program code with the intent of identifying whether that program code performs malicious actions. Further analysis may also identify what malicious acts are performed by program code. In certain instances, signatures may be generated from the reorganized data or from received computer information associated with a set of program code. These signatures may then be used by a deep packet inspection (DPI) engine when identifying potentially malicious code.

Figure 4:
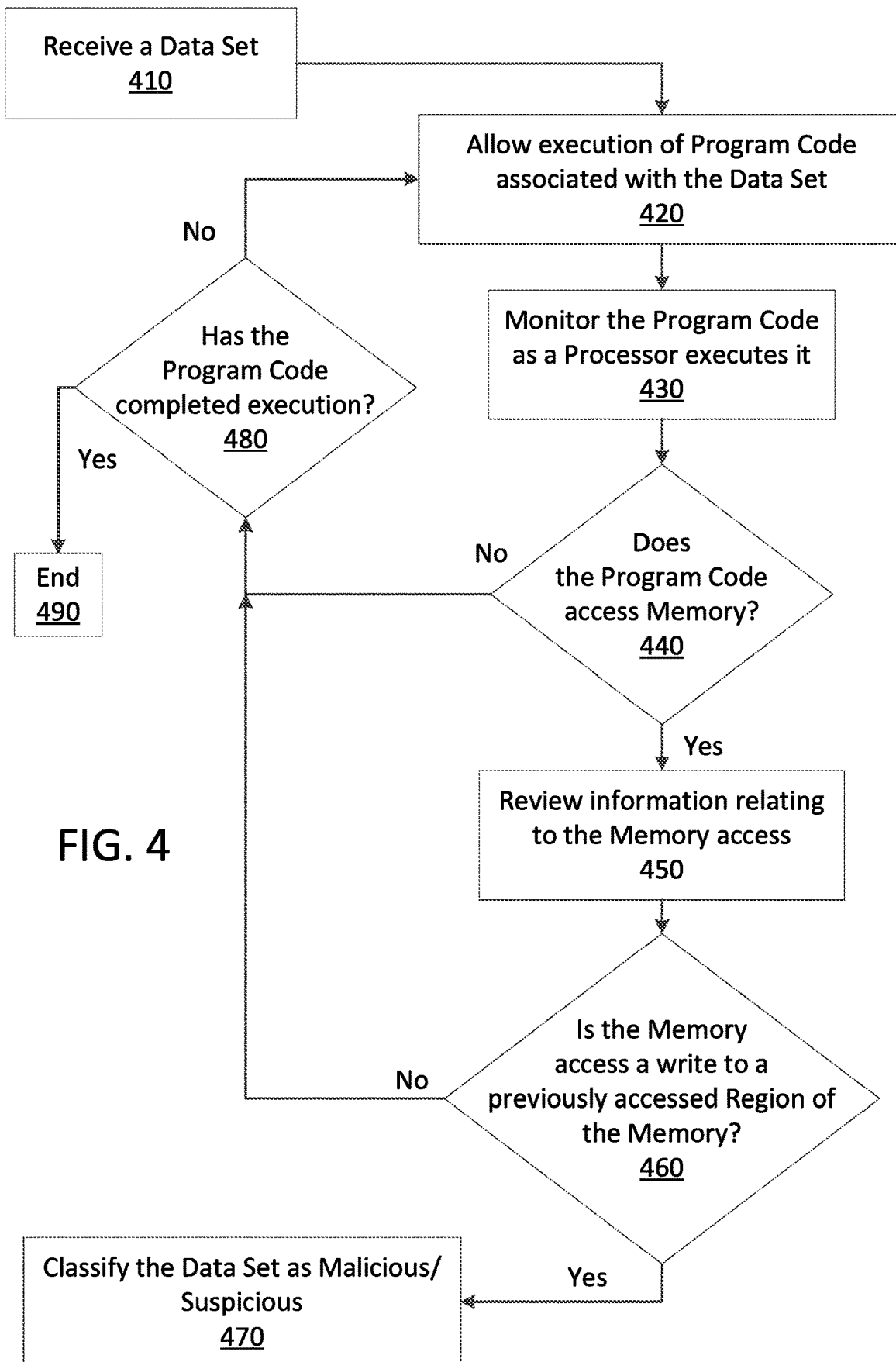
FIG. 4 illustrates a set of steps that identifies a memory access pattern that may be associated with malicious program code.

FIG. 4 illustrates a set of steps that identifies a memory access pattern that may be associated with malicious program code. FIG. 4 begins with step 410 that receives a data set, next program code associated with that data set is allowed to execute in step 420 of FIG. 4. After step 420, step 430 monitors the program code as it executes. Determination step 440 then identifies whether the operation of the program code accessed memory. This memory access may relate to allocating memory, reading from a memory, or writing to a memory. When step 440 identifies that the program code has accessed memory, program flow moves to step 450 where information relating to that memory access is reviewed. This review may correlate information related to the memory allocation with one or more reads or writes to that allocated memory. The review may correlate information related to a multiple writes to a location in or a region of memory.

After step 450, determination step 460 identifies whether this memory access is a write to a previously accessed location or region of the memory. When determination step 460 identifies that the memory access accesses a location that has been previously accessed by the program code, that program code may be classified as malicious or suspicious in step 470 of FIG. 4. This determination may be made based on data stored in memory matching a predefined criteria or pattern. For example, memory content may be matched to a criterion that associates suspicious events to a suspicious criterion using DBI techniques when identifying suspicious code. Alternatively or additionally, memory content may be identified as being malicious when scanned memory content matches signatures of known malicious code.

The program flow of FIG. 4 may flow from step 440 to step 480 when determination step 440 identifies that the program code does not access the memory. Program flow also flows from step 460 to step 480 when determination step 460 identifies that the memory access is not related to a previously accessed memory location or region. Determination step 480 then identifies whether the program code has completed. When the program code has completed, the flow chart of FIG. 4 ends at step 490. When determination step 480 identifies that the program code has not completed, program flow moves back to step 420 where the program code is once again allowed to execute.

Figure 5:
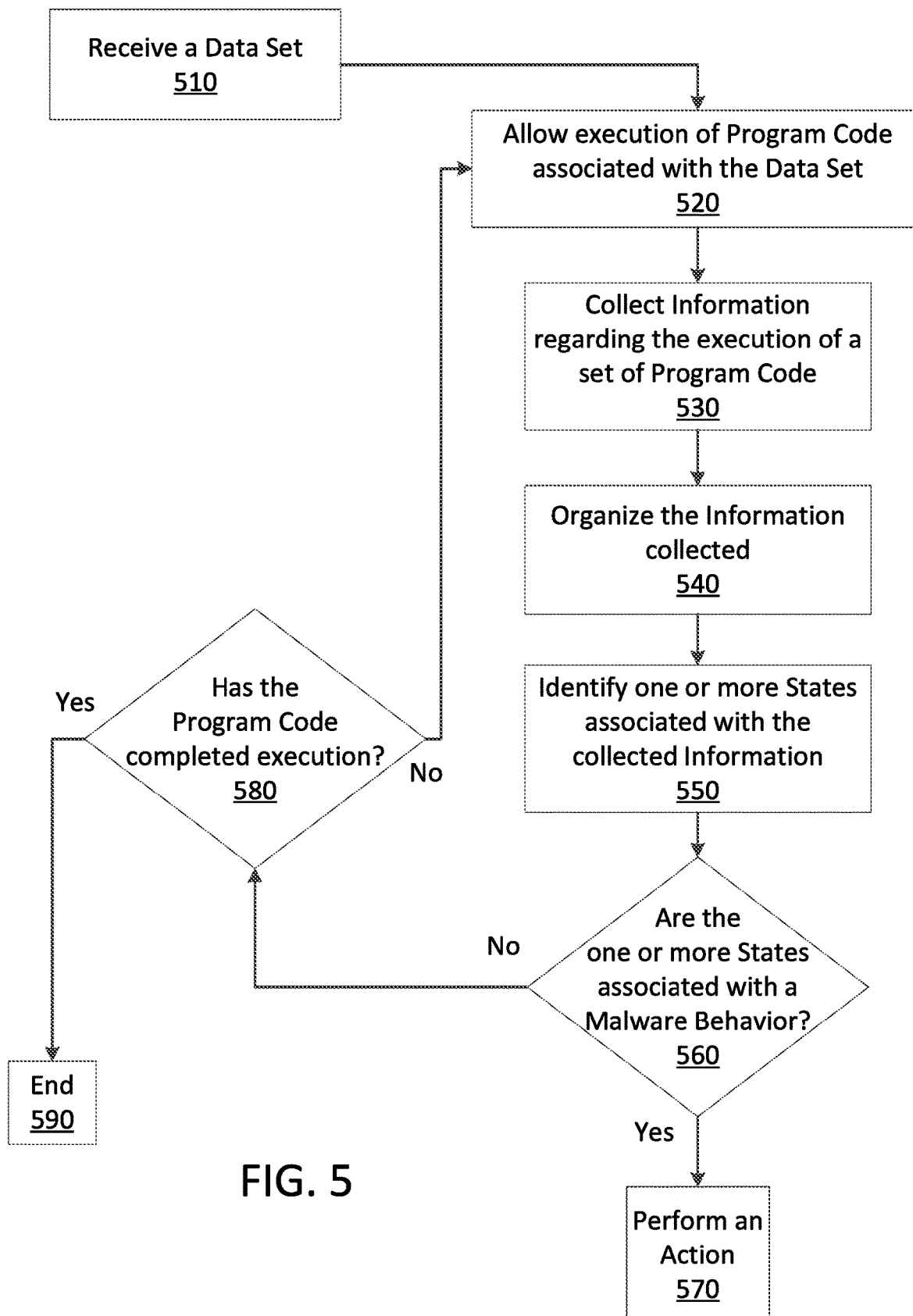
FIG. 5 illustrates a series of steps where executable code is observed while it is executed by a processor.

FIG. 5 illustrates a series of steps where executable code is observed while it is executed by a processor. FIG. 5 begins with step 510 where a data set is received, next in step 520 program code associated with that data set is allowed to execute. Step 530 of FIG. 5 is where information relating to the executed program code is collected. The information collected in step 530 may include context information that relates to the behavior of that software application as it executes in real-time. This context information may include the content of certain computer registers, parameters associated with a process performed by a processor executing code of the application, the content of certain memory locations, information that relates to the state of memory, information relating to the allocation of memory, or the initiation or completion of an operating system call or operation.

After information is collected in step 530, that information may be organized in step 540 of FIG. 5. The organization of collected information may store that collected information based on a classification. For example, the invocation of an operating system loader may be stored with a classification of a command associated with loading a program into memory. Next, in step 550 one or more states associated with the collected information may be identified. As such, step 550 may identify states associated with allocating memory, states relating to accessing memory, or states associated with writing different operating system calls. Alternatively or additionally states that may be associated with malware may include collecting information from a computing device and preparing that information to be sent to another computing device, may include initiating a write to a system registry, or may include initiating a write to a system area on a disk drive.

After step 560 determination step 560 may determine whether the states identified in step 550 appear to be related to malware. When determination step 560 identifies that the states identified in step 550 appear to be related to malware, program flow may move from step 560 to step 570 where an action may be performed. Here again, Actions that may be performed include, yet are not limited to sequestering the data set, saving the data set for future analysis, sending the data set to another computing device for analysis, or dumping/deleting the data set.

When determination step 570 identifies that the identified states appear not to be related to malware, program flow may move from step 560 to determination step 580 that identifies whether the program code has completed execution, when no program flow may move from step 580 back to step 520 where the program code is allowed to continue executing. When determination step 580 identifies that the program code has completed, program flow will move from step 580 to step 590 where the flow chart of FIG. 5 ends.

Figure 6:
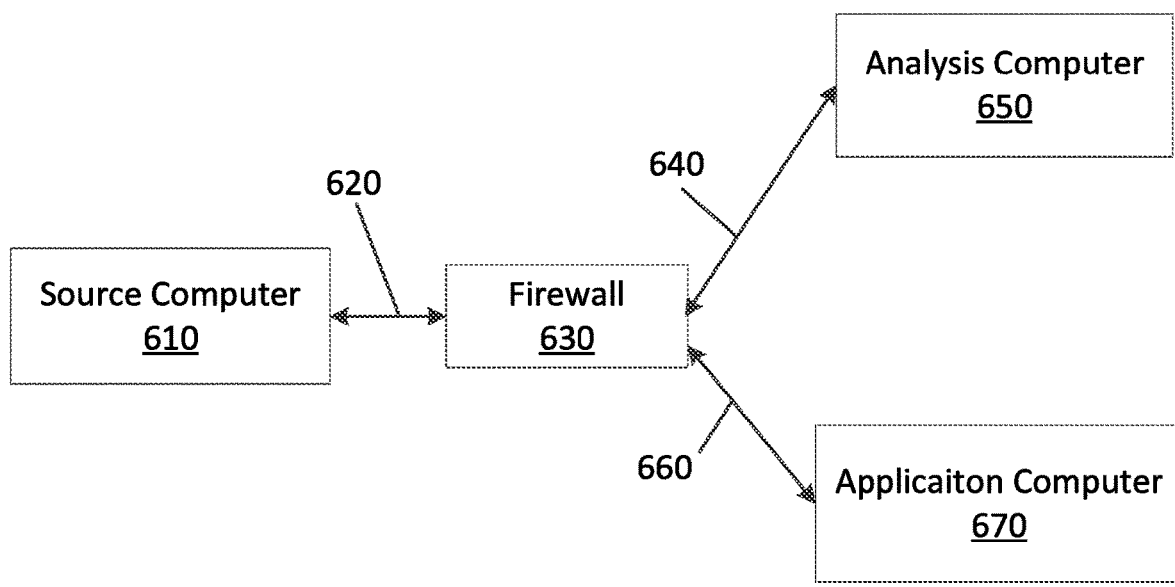
FIG. 6 illustrates a firewall communicating with an analysis computer when computer data is received from a source computer at a firewall.

FIG. 6 illustrates a firewall communicating with an analysis computer when computer data is received from a source computer at a firewall. In instances where computer data is received from source computer 610, firewall 630 or analysis computer 650 may perform operations consistent with the present disclosure. Alternatively or additionally operations at firewall 630 may be limited to identifying computer data that appears to exploit a vulnerability in a set of program code and analysis computer 650 may be used to perform additional analysis to identify whether potentially exploitative computer data actually performs a malicious act.

The operations of firewall 630 individually or when combined with analysis computer may protect application computer 670 from being hijacked or disrupted by potentially malicious code.

FIG. 6 includes a source computer 610, a firewall 630, an analysis computer 650, and an application computer 670 that may prevent malware from reaching the application computer 670. FIG. 6 also includes communications 620 sent to/from the application computer 670 via firewall 630, communications 660 sent to/from the destination computer 670, and communications 650 sent between the firewall 630 and the analysis computer 650. Note that communications 620 may be transmitted over a computer network such as the Internet, that communications 660 may be sent over computer network interfaces at the firewall 630 and at the destination computer 660, and that communications 640 may be sent between the firewall and the analysis computer via computer network interfaces at the firewall 630 and the analysis computer 650. Note also that any of the computer networks over which communications 620, 640, and 660 are sent may include wired or wireless network interfaces. Analysis computer 650 may also be remote from firewall 630 and analysis computer 650 may reside in the Cloud. Network interfaces associated with the present disclosure may include any form of wired or wireless network interface known in the art.

The various components of FIG. 6 may implement functions associated with the receipt and analysis of computer data that may have been requested by application computer 670 and have been provided by source computer 610. In such instances, firewall 630 and analysis computer 650 may perform functions consistent with receiving packets, receiving messages, receiving command, receiving login or other information, providing messages, or analyzing computer data sent from source computer 610 when identifying whether received data includes exploitative content. As such firewall 630 and analysis computer 650 may perform functions consistent with the present disclosure, including those functions described in respect to FIGS. 1-5.

Figure 7:
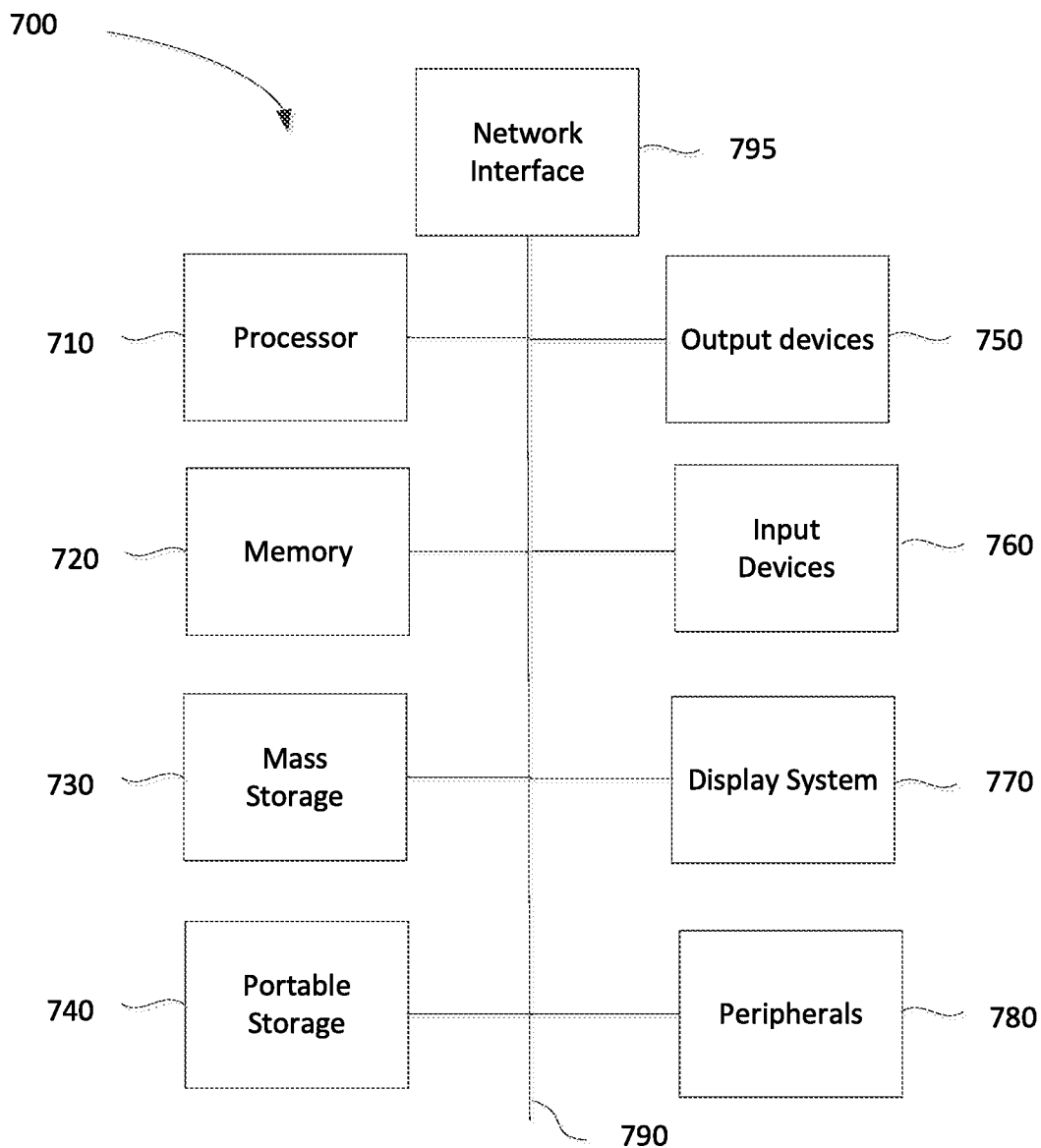
FIG. 7 illustrates a computing system that may be used to implement an embodiment of the present invention.

FIG. 7 illustrates a computing system that may be used to implement an embodiment of the present invention. The computing system 700 of FIG. 7 includes one or more processors 710 and main memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, peripheral devices 780, and network interface 795.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a FLASH memory, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD), a plasma display, an organic light-emitting diode (OLED) display, an electronic ink display, a projector-based display, a holographic display, or another suitable display device. Display system 770 receives textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include a modem or a router.

Network interface 795 may include any form of computer interface of a computer, whether that be a wired network or a wireless interface. As such, network interface 795 may be an Ethernet network interface, a BlueTooth™ wireless interface, an 802.11 interface, or a cellular phone interface.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 700 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, FLASH memory, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for analyzing data, the method comprising:
   storing environmental data that associates a mapping of memory addresses with sets of executable program code;
   identifying that execution of instructions included in data packets received at a computer results in the environmental data being accessed, wherein the identification further includes identifying that a memory address accessed by the execution of the instructions was previously written to by an initial instruction included in the data packets; and
   classifying the instructions received at the computer as suspicious based on the environmental data being accessed.

2. The method of claim 1, further comprising identifying that the execution of the instructions results in the accessing of a dynamic linked library (DLL).

3. The method of claim 1, further comprising identifying that the execution of the instructions results in the accessing of an operating system function that accesses a memory based on the mapping of memory addresses of the stored environmental data.

4. The method of claim 1, further comprising identifying that the execution of the instructions results in data associated with the sets of executable program code being overwritten.

5. The method of claim 1, further comprising identifying that the execution of the instructions results in the accessing of application program interface data.

6. The method of claim 1, further comprising identifying that the instructions included in the data packets are being executed out of a temporary directory.

7. The method of claim 1, further comprising identifying that data included in the data packets are de-obfuscated before the instructions included in the data packets are executed.

8. A non-transitory computer-readable storage medium having embodied thereon a program executable by a processor for implementing a method for analyzing data, the method comprising:
   storing environmental data that associates a mapping of memory addresses with sets of executable program code;
   identifying that execution of instructions included in received data packets results in the environmental data being accessed, wherein the identification further includes identifying that a memory address accessed by the execution of the instructions was previously written to by an initial instruction included in the data packets; and
   classifying the instructions included in received data packets as suspicious based on the environmental data being accessed.

9. The non-transitory computer-readable storage medium of claim 8, the program further executable to identify that the execution of the instructions results in the accessing of a dynamic linked library (DLL).

10. The non-transitory computer-readable storage medium of claim 8, further executable to identify that the execution of the instructions results in the accessing of an operating system function that accesses a memory based on the mapping of memory addresses of the stored environmental data.

11. The non-transitory computer-readable storage medium of claim 8, further executable to identify that the execution of the instructions results in data associated with the sets of executable program code being overwritten.

12. The non-transitory computer-readable storage medium of claim 8, further executable to identify that the execution of the instructions results in the accessing of application program interface data.

13. The non-transitory computer-readable storage medium of claim 8, further executable to identify that the instructions included in the data packets are being executed out of a temporary directory.

14. The non-transitory computer-readable storage medium of claim 8, further executable to identify that data included in the data packets are de-obfuscated before the instructions included in the data packets are executed.

15. A system for analyzing data, the system comprising a computer that includes:
    a memory that stores environmental data that associates a mapping of memory addresses with sets of executable program code; and
    a processor that executes instructions out of the memory to:

identify that execution of instructions included in data packets received via a computer network results in the environmental data being accessed, wherein the identification further includes identifying that a memory address previously accessed by the execution of the instructions was previously written to by an initial instruction included in the data packets, and
classify the instructions received at the computer as suspicious based on the environmental data being accessed.

16. The system of claim 15, further comprising a firewall that initially receives the data packets and that sends the data packets to the computer via the computer network.

17. The system of claim 15, wherein the processor identifies that the execution of the instructions results in the accessing of a dynamic linked library (DLL).

18. The system of claim 15, wherein the processor identifies that at the execution of the instructions results in the accessing of an operating system function that accesses a memory based on the mapping of memory addresses of the stored environmental data.

19. The system of claim 15, wherein the processor identifies that the execution of the instructions results in data associated with the sets of executable program code being overwritten.

20. A method for analyzing data, the method comprising:

storing environmental data that associates a mapping of memory addresses with sets of executable program code;

identifying that execution of instructions included in data packets received at a computer results in the environmental data being accessed, wherein the identification further includes identifying that the instructions included in the data packets are being executed out of a temporary directory; and classifying the instructions received at the computer as suspicious based on the environmental data being accessed.

* * * * *